April 17, 1962     P. A. M. GELL     3,030,434
GLASS MELTING
Filed June 9, 1959     2 Sheets-Sheet 1
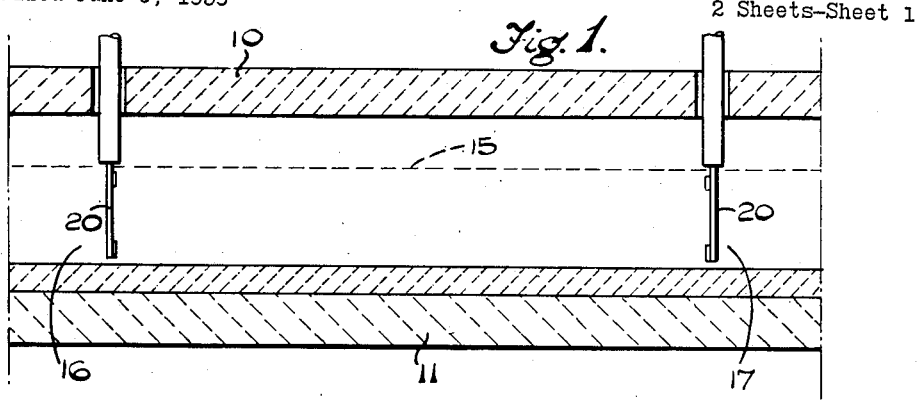
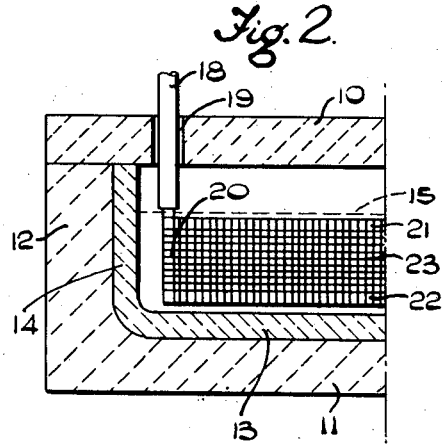
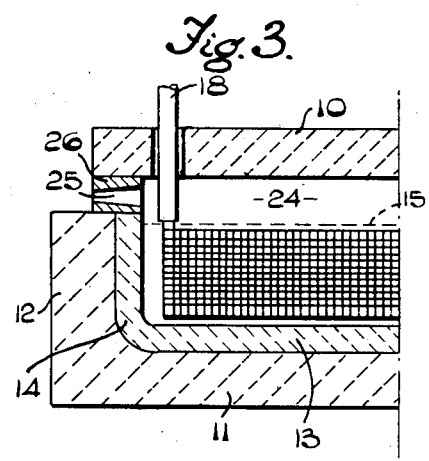
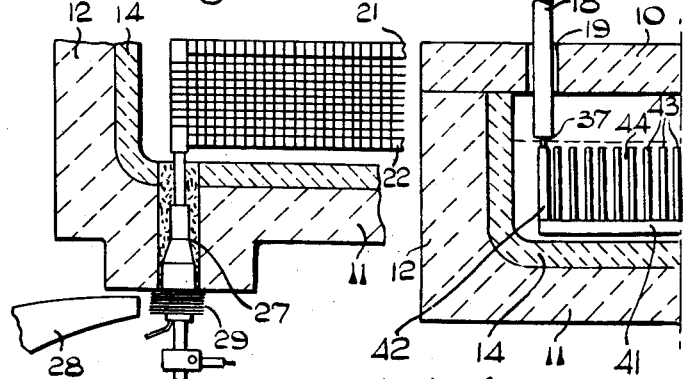
Philip Anthony Maunsell Gell.
INVENTOR   BY Kurt Kelman AGENT

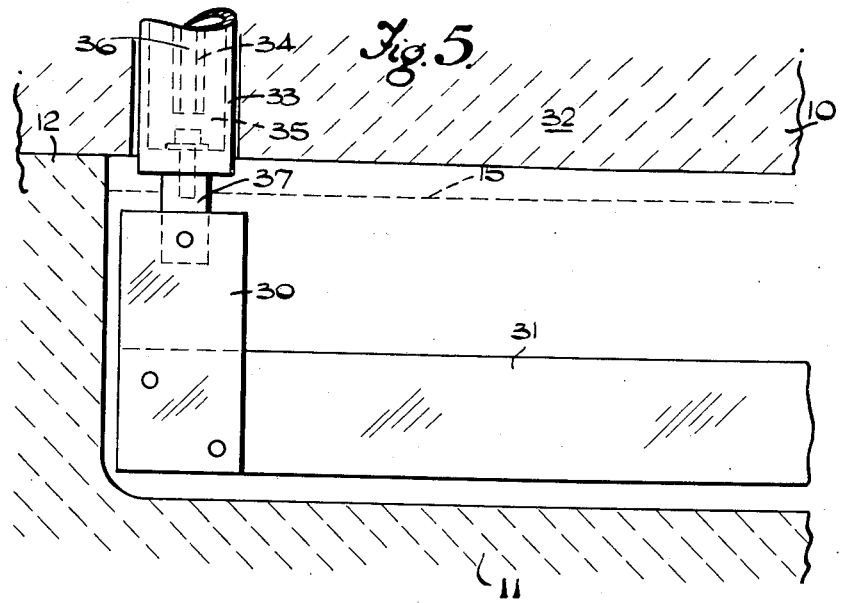
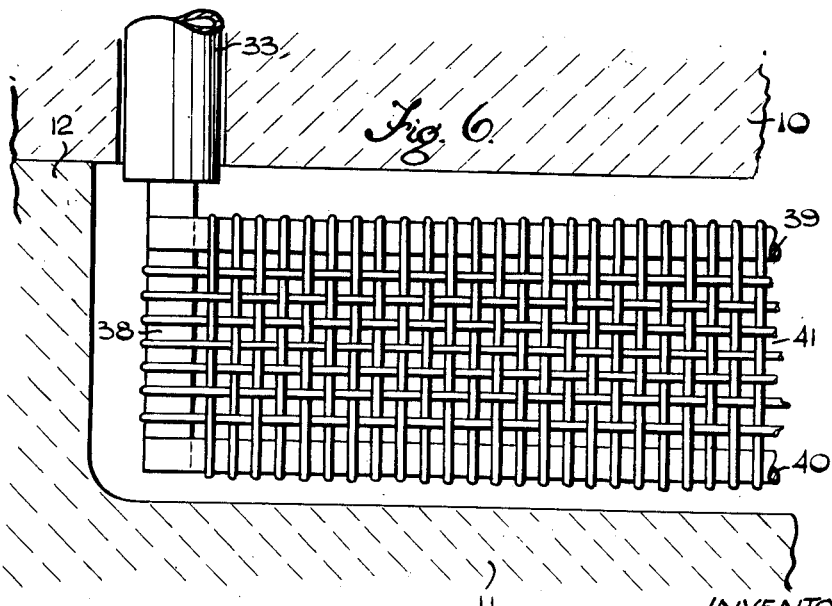

United States Patent Office 3,030,434
Patented Apr. 17, 1962

3,030,434
GLASS MELTING
Philip Anthony Maunsell Gell, Caynton, near Shifnal, England, assignor to Elemelt Limited, Bilston, England, a British company
Filed June 9, 1959, Ser. No. 819,124
6 Claims. (Cl. 13—6)

This invention relates to a method of melting and supplying glass (which term is to be deemed to include vitreous materials generally) in a furnace chamber and supplying such molten glass to a feeder chamber from which it is delivered for fabrication or other use, and wherein the molten glass is caused to flow along a feeder duct extending between the furnace chamber and the feeder chamber.

This method will hereinafter be referred to as a method of melting and supplying glass of the kind specified.

In carrying out a method of melting and supplying glass of the kind specified, a plurality of feeder chambers may be connected by respective ducts to a single furnace chamber. The furnace chamber may comprise a melting chamber into which glass batch materials are fed for melting. Any necessary degree of refining may be carried out in this melting chamber of alternatively the melting chamber may be connected with a refining chamber into which molten glass is led from the melting chamber and caused to undergo refining, or further refining.

Further, in some cases, a working chamber may be provided. This may be connected either directly to the melting chamber (if no separate refining chamber is provided) or in the alternative arrangement it may be connected to the refining chamber. The term "furnace chamber" is to be deemed to include any of the foregoing chambers or combinations thereof as may be appropriate for the particular glass melting, and if necessary refining operations required to be conducted in the furnace chamber.

In cases where a plurality of feeder chambers are provided in association with a single furnace chamber these may be situated at angularly spaced positions in plan around the furnace chamber. This permits of the accommodation around the furnace chamber of machines or other apparatus for the fabrication of the glass fed out of the feeder chambers. It will be understood, however, that there are circumstances in which only a single feeder chamber may be associated operatively with a furnace chamber such, for example, where it is convenient that the machine or other apparatus for fabricating the glass to be situated at some appreciable distance from the furnace chamber.

Hitherto in practising the method of melting and supplying glass of the kind specified the glass in the feeder duct has been supplied with heat by means of fuel fed burners disposed in a space above the surface level of the glass in the duct. The purpose of supplying heat to the glass in the feeder duct is to ensure that so far as possible there is a gradual temperature change between the value of temperature required to be set up in the glass in the furnace chamber (for promoting satisfactory refining of the glass at the particular rate of throughput demanded by the machine or other apparatus performing the fabrication) and the temperature required to be set up in the glass in the feeder chamber (for the purpose of ensuring that the viscosity of the glass fed out from the feeder chamber shall have a value requisite for the satisfactory performance of the fabrication operations). It will be appreciated that in most cases there will be a temperature drop between the glass in the furnace chamber and the glass in the feeder chamber, although there are circumstances in which a temperature rise might be required.

It is important that so far as possible the glass in the feeder duct and in the feeder chamber shall be homogeneous, that is to say free from layers or other local accumulations which differ in viscosity characteristics from the main surrounding body of glass, because the presence of such layers or accumulations is extremely detrimental to the satisfactory carrying out of fabrication. Even when such operations are not actually prevented the resulting products may be defective through the presence of striae.

In the method of melting and supplying glass of the kind specified as hitherto practised, difficulty is experienced in maintaining a satisfactory homogeneous condition, due principally to the fact that the heat supplied in the feeder duct for the purpose of ensuring controlled cooling along the length of the duct (or possibly controlled heating) is communicated to the surface layer of the glass and is transmitted downwardly therethrough so that the surface layers of the glass tend to be of appreciably higher temperature than the layers near the bottom of the feeder channel.

According to the invention, a method of melting and supplying glass of the kind specified is characterised in that the molten glass is conducted along the feeder duct by the steps of flowing the molten glass through said duct, passing an alternating current through said flowing molten glass lengthwise of the direction of the flow thereof by communicating said current to said glass at a plurality of positions spaced apart longitudinally of the duct over an area extending for substantially the whole width and depth of the glass in said duct.

The current may be controlled to compensate only partly for heat loss from the feeder duct and hence to provide conversion from a higher temperature, and hence lower viscosity, in the furnace chamber requisite to obtain satisfactory refining at the required rate of throughput, to a lower temperature, and hence higher viscosity, in the feeder chamber requisite for the satisfactory performance of fabricating operations on the glass fed out from the feeder chamber.

Typically the temperature in the furnace chamber may be such as to produce a viscosity of the order of $1.5 \times 10^2$ poises, and the temperature in the feeder chamber may be such as to produce a viscosity of $10^3$ poises.

The glass may be heated in the furnace chamber and, if desired, in the feeder chamber by the passage through the glass of an alternating electric current between spaced apart electrodes, but the invention is applicable to methods of melting and supplying glass of the kind specified wherein heating in the furnace chamber (and possibly in the feeder chamber also) is effected by other means, such as fuel fed burners.

In cases where the level of glass in the duct is less than the height of the duct itself heat may be supplied to the space above the glass by fuel fed burners.

The invention further relates to a furnace assembly hereinafter referred to as being of the kind specified, comprising a furnace chamber in which glass is melted, and one of more feeder chambers supplied therefrom.

According to this aspect of the invention a furnace assembly of the kind specified is characterised by the provision of a feeder duct extending substantially horizontally and connecting said chambers, a plurality of electrodes disposed at longitudinally spaced apart positions along said duct, means for supporting said electrodes in said positions, each of said electrodes comprising a screen of electrically conductive material extending for substantially the whole of the normal depth and width of glass flowing through said duct between said chambers, said screens having apertures distributed over their whole areas through which the glass can flow, and means for passing an alternating electric current between said electrodes.

For feeder ducts of short length, that is to say up to about 8 feet, one such electrode may be positioned at or near the inlet to the feeder duct and another such electrode at or near the outlet of the feeder duct. If desired, and especially for feeder ducts of greater length, one or more further electrodes may be positioned at stations intermediate the inlet and outlet ends of the feeder duct, the supply circuit being arranged to establish current flow through the glass longitudinally of the duct between successive electrodes. This last described arrangement permits of the possibility of establishing a current flow of greater density along some portions of the length of the duct than obtains in other portions of the length and thereby of exercising precise control over the rate of cooling (or possibly heating) of the glass between the inlet and outlet ends of the duct.

The invention is illustrated in the accompanying drawings wherein:

FIGURE 1 is a view in vertical cross section taken longitudinally of a feeder duct provided with electrode means of one form in accordance with the invention.

FIGURE 2 is a transverse vertical cross section through the construction illustrated in FIGURE 1.

FIGURE 3 is a view similar to FIGURE 2 illustrating a modification in the duct construction when it is desired to utilise fuel fed burners as well as electrode means.

FIGURE 4 is a fragmentary view similar to FIGURE 3 illustrating a further modification wherein current is supplied to the electrode means through the bottom wall of the feeder duct.

FIGURE 5 is a further fragmentary view similar to FIGURE 4 illustrating an alternative form of electrode means.

FIGURE 6 is a view similar to FIGURE 4 illustrating a still further alternative form of electrode means, and FIGURE 7 is a view similar to FIGURE 4 illustrating yet another alternative form of electrode means.

Referring firstly to FIGURES 1 and 2 of the drawings wherein a part only of the total length of the feeder duct is shown, it will be understood that such duct may be connected at one of its ends to a furnace chamber and at the other of its ends to a feeder chamber. The furnace chamber and the feeder chamber may be of any suitable form. Each of these chambers may be provided with any suitable form of heating means for the glass contained therein such as immersed electrodes with which is associated in each case a suitable supply circuit for passing alternating current to the body of glass contained in each of these chambers for the purpose of heating same to the desired temperature.

The feeder duct with which the present invention is concerned and of which part of the length is seen in FIGURE 1 may comprise a top wall 10 and a bottom wall 11 which are connected and spaced apart by side walls from which one is seen at FIGURE 2 at 12. The bottom and side walls may have linings 13 and 14 of any suitable refractory material and conveniently, but not essentially, the feeder duct is of rectangular form as seen in transverse vertical cross section.

As indicated in FIGURE 2 the depth of glass of which the surface is shown at 15 is less than the height of the feeder duct, but it will be understood that if desired the glass may occupy the whole height of the feeder duct in which case certain modifications of the electrode means may be adopted as hereinafter referred to.

In the construction illustrated, the duct is provided with longitudinally spaced electrodes 16 and 17 connected to the output terminals of a supply circuit (not illustrated) by means of which an alternating electric current can be passed through the glass contained in the feeder duct in a direction lengthwise thereof.

These electrodes may be of like form and comprise electrode supports 18 extending through apertures 19 of the top wall 10 of the feeder duct at positions spaced apart laterally, so that each electrode has two such supports disposed adjacent to the side walls 12 of the feeder duct and possibly one or more further supports at positions spaced cross-wise of the feeder duct.

The electrode member proper may comprise a frame composed of side members 20 which are connected at their lower ends and at positions adjacent to the supports 18 by upper and lower transverse members 21 and 22, the aperture of the frame thus formed being spanned by a mesh structure 23.

The frame members 20 to 22 may be formed of strips of molybdenum secured together at the corners of the frame by fastening elements such as rivets or bolts, while the mesh structure may be composed of molybdenum wire the end portions of the individual wire elements being bent round the side members or the upper and lower transverse members as appropriate and retained in position either frictionally or if desired, by auxiliary means such as welding the wires of the side and transverse members or providing clamping strips in association therewith.

It will be observed that the electrode proper, as seen particularly in FIGURE 2, occupies substantially the whole of the cross sectional area of the glass contained within the feeder duct, but by virtue of the fact that the electrode proper is of a permeable character it does not offer any significant impediment to the flow of glass along the duct.

Typically the molybdenum wire utilised for the mesh structure may be of ⅛" diameter and the mesh may afford apertures of a ¼" square. This construction would be appropriate for feeder ducts having a height from about 4 inches to 12 inches and from 12 inches to 30 inches in width. For feeder ducts of larger cross sectional dimensions, the mesh structure could be composed of strip elements of molybdenum, the cross sectional dimensions of which will be selected to afford the requisite mechanical strength to withstand end thrust produced by flow of glass along the feeder, whilst the spacing between such strips and hence the mesh aperture size would be determined so as to avoid any undesirable impediment to the flow of glass consistent with communicating electrical current to the glass more or less uniformly throughout substantially the whole of the cross sectional area of the glass.

The electrode supports 18 may be made of a nickel chromium alloy known under the name of nimonic or may possibly be made of molybdenum in the form of rods sheathed with platinum or other protective metal capable of withstanding the temperatures involved, or possibly sheathed with a ceramic material to prevent oxidation of the molybdenum where it is exposed to an oxidising atmosphere.

The longitudinal distance between pairs of electrodes 16 and 17 will vary according to the glass composition and temperature as well as a temperature gradient required lengthwise of the feeder duct, so that it is contemplated that these longitudinal spacings between associated electrodes may be any value from about 2 feet to about 30 feet. Typically however the spacings may be of the order of 14 feet.

In cases where it is desired to operate the feeder duct with the glass level 15 up to the top wall 10 of the feeder duct, the dimensions of the electrode proper would be modified so as to include side frame members 20 of a depth equal or approximately equal to the depth of the feeder duct itself, whereby the mesh structure 23 and associated frame would occupy substantially the whole cross sectional area of the glass.

In some cases however, where the glass level 15 is below the top wall 10, heat may be supplied to the space 24 above the level 15 of the glass as illustrated particularly in FIGURE 3, by means of fuel fed burners mounted in or operating through openings 25 in apertured blocks 26 interposed between the upper ends of the side walls 12 and the top wall 10 of the feeder duct. In this case the burners would ideally be operated so that the temperature in the space 24 is equal or approximately equal to the temperature maintained in the surface layers of the glass adjacent to the level 15, so as to preserve as near as possible complete uniformity of temperature throughout the whole of the cross sectional area of the glass.

In the alternative construction illustrated in FIGURE 4 in which parts corresponding to those of FIGURES 1 and 2 have been designated by like numerals of reference, the electrodes 16 and 17 are supported through the bottom wall 11 of the feeder duct in this case by the use of electrode supports as described and claimed in British specification No. 664,121, such supports 27 being cooled externally of the bottom wall by means of a duct 28 through which a supply of cooling air is directed on to the gills 29 of the electrode support.

In FIGURE 5 is illustrated yet another alternative construction in which parts corresponding to those of FIGURES 1 and 2 have again been designated by like numerals of reference.

In this construction the electrode proper comprises vertical side plates such as 30 disposed adjacent to the side walls 12 of the feeder duct and a transverse plate 31 which occupies a proportion of the depth of the glass contained in the feeder duct, typically from 30% to 60% of such depth, a preferred value being about 40%.

The electrode plate 31 may be disposed in the lower part of the feeder duct and if desired, auxiliary means (not illustrated) such as fuel fed burners as described with reference to and as illustrated in FIGURE 3, may be provided to supply heat to the space 32 at the level 15 of the surface of the glass.

The electrode support in this case may comprise an outer tube 33 which may be made of mild steel and which is sub-divided internally by provision of an inner tube 34 to provide two passageways 35 and 36 communicating with each other at their inner ends through which a cooling fluid such as water can be circulated through the support.

Any over-cooling of the side plates 30 of the electrode proper may be avoided by providing a spacer element 37 between the lower end of the outer tube 33 and the upper end of the side plate 30.

FIGURE 6 illustrates an arrangement similar to FIGURE 5 in that the internally fluid cooled support is provided for the electrode proper, the latter however, being composed of a frame structure including side members 38 and upper and lower transverse members 39 and 40 in the form of molybdenum rods, the aperture afforded by this frame being spanned by the mesh structure 41 of molybdenum wire as already described.

In the construction illustrated in FIGURE 7 wherein again parts corresponding to those of FIGURES 1 and 2 have been indicated by like numerals of reference the electrode proper comprises a bottom bar 41 extending transversely of the duct parallel to the bottom wall thereof and at a position spaced only a short distance above the bottom wall. Projecting upwardly from the bar or strip 41 at each end thereof are side members 42 which may be formed integrally with the bottom bar 41 or secured thereto in any suitable manner as for example by bolts or rivets.

Also projecting upwardly from the bottom bar or strip 41 are a plurality of rods 43 which may be of smaller cross sectional dimensions than the side members 42 and which are secured at their lower ends in any suitable manner to the bottom bar or strip as for example, by means of threaded end portions forming studs which screw into threaded sockets in the bar or strip or by means of welding or other suitable expedients.

The rods 43 afford spaces 44 between them which collectively occupy a sufficient area to provide for substantially unimpeded flow of the glass. The members 41, 42 and 43 collectively communicate current to the glass over substantially the whole cross sectional area of the glass within the duct. The members 41, 42 and 43 may be formed of molybdenum and the supports 18 may be as described with reference to and as illustrated in the construction shown in FIGURE 5.

It will be understood that electrodes such as 16 and 17 may be placed at each end of a feeder duct, or any number of such electrodes may be placed at longitudinally spaced positions along the duct.

The electrical supply circuit for such electrodes may include separate transformers or (secondary windings of a single transformer), the output terminals of which are connected to successive electrodes respectively of this series. Preferably the secondary circuits supplying each pair of successive electrodes are provided with means permitting the voltage applied between each such pair of electrodes to be controlled so that the current density in the glass at different positions along the length of the duct may be regulated as desired, in order to achieve the requisite temperature gradient between the furnace chamber from which glass is fed into the duct and the feeder chamber from which the glass is taken off for fabrication or other use. Such temperature gradient may achieve an increase in viscosity of this glass, due to heat loss from the walls of the duct which is only partly compensated by heat generated in the glass by the passage of the alternating electric current therethrough.

What I claim then is:

1. In a furnace assembly comprising a furnace chamber for containing a body of molten glass and a feeder chamber from which such glass is delivered for use, the provision of; a feeder duct extending substantially horizontally between and connecting said chambers, a plurality of electrodes disposed at longitudinally spaced apart positions along said duct, means for supporting said electrodes in said positions, each of said electrodes comprising a screen of electrically conductive material extending for substantially the whole of the normal depth and width of glass flowing through said duct between said chambers, said screens having apertures distributed over their whole areas through which the glass can flow, and means for passing alternating electric current between said electrodes.

2. In a furnace assembly comprising a furnace chamber for containing a body of molten glass and a feeder chamber from which such glass is delivered for use, the provision of; a feeder duct extending substantially horizontally between and connecting said chambers, and of substantially greater length than its greatest cross-sectional dimension, a plurality of electrodes disposed at longitudinally spaced apart positions along said duct, means for supporting said electrodes in said positions, each of said electrodes comprising a screen of electrically conductive material extending for substantially the whole of the normal depth and width of glass flowing through said duct between said chambers, said screens having apertures distributed over their whole areas through which the glass can flow, and means for passing alternating electric current between said electrodes of a value to generate a less heat in said glass than that lost from said duct during flow of the glass therethrough.

3. In a furnace assembly comprising a furnace chamber for containing a body of molten glass and a feeder chamber from which such glass is delivered for use, the provision of; a feeder duct extending substantially horizontally between and connecting said chambers, and having top, side and bottom walls a plurality of electrodes disposed at longitudinally spaced apart positions along said duct, each of said electrodes comprising at least one support member extending through the top wall of said duct an electrically conductive cross member carried by said support member and extending from side to side of said duct internally thereof, and a plurality of electrically conductive rod elements carried by said cross member spaced apart laterally and distributed over substantially the whole width of said duct and means for passing alternating electric current between said electrodes.

4. In a furnace assembly comprising a furnace chamber for containing a body of molten glass and a feeder chamber from which such glass is delivered for use, the provision of; a feeder duct extending substantially horizontally between and connecting said chambers, a plurality of electrodes disposed at longitudinally spaced apart positions along said duct, means for supporting said electrodes in said positions, each of said electrodes comprising an outer electrically conductive frame structure bordering the lateral and lower internal boundaries of said duct and an electrically conductive grid spanning said frame structure and composed of wire elements connected mechanically and electrically with said frame structure and of cross sectional dimensions in the plane of said grid which are small relatively to its area and spaced apart to provide apertures in said grid which are also small relatively to its area, and means for passing alternating electric current between said electrodes.

5. A method of conducting molten glass along a generally horizontally extending feeder duct which is long relatively to its cross sectional dimensions from a furnace chamber to a feeder chamber; comprising the steps of flowing the molten glass through said duct, and passing an alternating current through said flowing molten glass lengthwise of the direction of flow thereof by communicating said current to said glass at a plurality of positions spaced apart longitudinally of said duct over an area extending for substantially the whole width and depth of glass in said duct and controlling the value of said current to effect heating of the glass uniformly between said positions.

6. A method of conducting molten glass along a feeder duct which is long relatively to its cross sectional dimensions from a furnace chamber to a feeder chamber; comprising the steps of flowing the molten glass through said duct, and passing an alternating current through said flowing molten glass lengthwise of the direction of flow thereof by communicating said current to said glass at a plurality of positions spaced apart longitudinally of said duct over an area extending for substantially the whole width and depth of glass in said duct, and controlling the current to a value to effect heating of the glass uniformly between said positions and such that cooling of the flowing glass due to heat loss from said duct is only partly compensated by heat generated in said flowing glass by said current.

References Cited in the file of this patent

UNITED STATES PATENTS

| | | |
|---|---|---|
| 2,215,982 | Slayter et al. | Sept. 24, 1940 |
| 2,225,617 | Borel et al. | Dec. 24, 1940 |
| 2,244,267 | Slayter et al. | June 3, 1941 |
| 2,280,101 | Slayter et al. | Apr. 21, 1942 |
| 2,686,820 | Arbeit et al. | Aug. 17, 1954 |
| 2,697,125 | Douglas | Dec. 14, 1954 |

FOREIGN PATENTS

| | | |
|---|---|---|
| 489,207 | Great Britain | July 21, 1938 |
| 779,371 | Great Britain | July 17, 1957 |
| 1,019,443 | Germany | Nov. 14, 1957 |